US 11,923,617 B2

(12) United States Patent
Alloulah et al.

(10) Patent No.: US 11,923,617 B2
(45) Date of Patent: Mar. 5, 2024

(54) APPARATUS FOR REFLECTING ELECTROMAGNETIC WAVES AND METHOD OF OPERATING SUCH APPARATUS

(71) Applicant: Nokia Technologies Oy, Espoo (FI)

(72) Inventors: Mohammed Alloulah, Cambridge (GB); Zoran Radivojevic, Cambridge (GB); Howard Huang, New York, NY (US); Fahim Kawsar, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 17/289,086

(22) PCT Filed: Oct. 31, 2018

(86) PCT No.: PCT/EP2018/079863
§ 371 (c)(1),
(2) Date: Apr. 27, 2021

(87) PCT Pub. No.: WO2020/088755
PCT Pub. Date: May 7, 2020

(65) Prior Publication Data
US 2022/0006202 A1    Jan. 6, 2022

(51) Int. Cl.
*H01Q 3/20* (2006.01)
*G01S 13/75* (2006.01)
(Continued)

(52) U.S. Cl.
CPC ............ *H01Q 3/20* (2013.01); *G01S 13/756* (2013.01); *H01Q 3/44* (2013.01); *H01Q 9/0407* (2013.01);
(Continued)

(58) Field of Classification Search
CPC .... H01Q 15/14; H01Q 15/147; H01Q 15/148; H01Q 19/01; H01Q 3/16–20
See application file for complete search history.

(56) References Cited

U.S. PATENT DOCUMENTS 2,580,921 A * 1/1952 Iams ...................... H01Q 15/23
343/912
3,882,503 A * 5/1975 Gamara ................... H01Q 3/20
343/915
(Continued)

FOREIGN PATENT DOCUMENTS

CN        107394318 A    11/2017
CN        109792100 A     5/2019
(Continued)

OTHER PUBLICATIONS

IEEE, "Part 11: Wireless LAN Medium Access Control (Mac) and Physical Layer (PHY) Specifications." Standard 802.11 (2016): 1-3532.
(Continued)

*Primary Examiner* — Ab Salam Alkassim, Jr.
(74) *Attorney, Agent, or Firm* — Mendelsohn Dunleavy, P.C.; Steve Mendelsohn

(57) ABSTRACT

Apparatus comprising at least one movable reflective surface configured to reflect electromagnetic waves and at least one actuator coupled with the at least one movable reflective surface, wherein said at least one actuator is configured to at least temporarily drive a movement of said at least one reflective surface.

19 Claims, 4 Drawing Sheets

(51) Int. Cl.
| | |
|---|---|
| *H01Q 3/44* | (2006.01) |
| *H01Q 9/04* | (2006.01) |
| *H01Q 15/00* | (2006.01) |
| *H01Q 15/14* | (2006.01) |
| *H01Q 15/16* | (2006.01) |
| *H01Q 19/10* | (2006.01) |

(52) U.S. Cl.
CPC ........... *H01Q 15/002* (2013.01); *H01Q 15/14* (2013.01); *H01Q 15/141* (2013.01); *H01Q 15/147* (2013.01); *H01Q 15/148* (2013.01); *H01Q 15/165* (2013.01); *H01Q 19/106* (2013.01)

(56) References Cited

U.S. PATENT DOCUMENTS

| | | | |
|---|---|---|---|
| 4,361,911 A | 11/1982 | Buser et al. | |
| 4,589,740 A * | 5/1986 | Durremberger | G01S 17/74 359/224.1 |
| 4,631,547 A * | 12/1986 | Jacavanco | H01Q 19/021 343/915 |
| 5,063,389 A * | 11/1991 | Reits | H01Q 15/147 343/915 |
| 5,345,243 A * | 9/1994 | Levis | G01S 7/415 342/6 |
| 5,351,060 A * | 9/1994 | Bayne | H01Q 3/20 342/359 |
| 5,355,241 A * | 10/1994 | Kelley | G02B 26/02 342/45 |
| 5,767,802 A | 6/1998 | Kosowsky et al. | |
| 5,819,164 A | 10/1998 | Sun et al. | |
| 5,841,392 A | 11/1998 | Kishimoto | |
| 6,137,623 A * | 10/2000 | Roberson | G01S 17/74 359/290 |
| 6,233,088 B1 * | 5/2001 | Roberson | G02B 5/122 359/224.1 |
| 6,750,807 B1 * | 6/2004 | Hager | H01Q 1/28 342/120 |
| 6,914,554 B1 | 7/2005 | Riley et al. | |
| 10,020,576 B2 * | 7/2018 | Yi | H01Q 15/147 |
| 10,581,162 B2 * | 3/2020 | Nishimura | H01Q 15/16 |
| 2002/0128052 A1 * | 9/2002 | Neagley | H01Q 3/2647 455/575.1 |
| 2003/0048971 A1 * | 3/2003 | Ionov | G02F 1/011 385/40 |
| 2005/0017913 A1 * | 1/2005 | Orfei | H01Q 15/147 343/912 |
| 2005/0105914 A1 | 5/2005 | Chen | |
| 2005/0163511 A1 | 7/2005 | Cicchiello | |
| 2006/0232440 A1 * | 10/2006 | Pieralli | G01S 13/756 340/905 |
| 2009/0015498 A1 | 1/2009 | Deng et al. | |
| 2012/0229355 A1 * | 9/2012 | Scolamiero | H01Q 15/168 343/915 |
| 2013/0113644 A1 * | 5/2013 | Nakagawa | G01F 23/284 342/6 |
| 2014/0070921 A1 | 3/2014 | Jansseune | |
| 2014/0266955 A1 * | 9/2014 | Yi | H01Q 15/165 343/837 |
| 2015/0029051 A1 | 1/2015 | Driscoll et al. | |
| 2015/0145726 A1 * | 5/2015 | Stambovsky | H01Q 3/01 343/915 |
| 2015/0319616 A1 | 11/2015 | Kim | |
| 2016/0134006 A1 * | 5/2016 | Ness | H01Q 13/025 343/880 |
| 2017/0325087 A1 | 11/2017 | Drokov et al. | |
| 2017/0338556 A1 * | 11/2017 | Yi | H01Q 15/165 |
| 2017/0373371 A1 | 12/2017 | Gabriel | |
| 2018/0053996 A1 * | 2/2018 | Nishimura | H01Q 15/16 |
| 2018/0062246 A1 | 3/2018 | Hershey et al. | |
| 2018/0356342 A1 * | 12/2018 | Laycock | G02B 26/06 |
| 2019/0033682 A1 | 1/2019 | Kafaie Shirmanesh et al. | |
| 2021/0080626 A1 * | 3/2021 | Radivojevic | H01Q 15/141 |
| 2021/0328677 A1 | 10/2021 | Pasquali | |
| 2023/0228862 A1 * | 7/2023 | Li | G01S 17/58 342/83 |

FOREIGN PATENT DOCUMENTS

| | | | | |
|---|---|---|---|---|
| EP | | 3021419 A1 | 5/2016 | |
| WO | WO-2016193476 A1 * | | 12/2016 | H01Q 1/44 |

OTHER PUBLICATIONS

International Search Report and Written Opinion for corresponding International application No. PCT/EP2018/079863; dated Sep. 18, 2019 (16 pages).

International Preliminary Report on Patentability for corresponding International application No. PCT/EP2018/079863; dated Apr. 27, 2021 (11 pages).

Communication Relating to the Results of the Partial International Search for corresponding International application ho. PCT/EP2018/079863; dated Jul. 17, 2019 (11 pages).

First Examination Report for corresponding Indian application No. 202117024151; dated Feb. 24, 2022 (7 pages).

Chandra, Kishor, et al. "Performance Analysis of IEEE 802.11ad MAC Protocol." IEEE Communications Letters 21.7 (2017): 1513-1516.

Chiriyath, Alex R., et al. "Radar-Communications Convergence: Coexistence, Cooperation, and Co-Design." IEEE Transactions on Cognitive Communications and Networking 3.1 (2017): 1-12.

Mavridou, Marina, et al. "Dynamically Reconfigurable High Impedance and Frequency Selective Metasurfaces Using Piezoelectric Actuators." IEEE Transactions on Antennas and Propagation 64.12 (2016): 5190-5197.

Yaman, Yavuz, et al. "Reducing the LOS Ray Beamforming Setup Time for IEEE 802.11ad and IEEE 802.15.3c." MILCOM 2016—2016 IEEE Military Communications Conference, Baltimore, MD (2016): 448-453.

Yeo, Hui-Shyong, et al. "RadarCat: Radar Categorization for Input & Interaction." Proceedings of the 29th Annual Symposium on User Interface Software and Technology. ACM, New York, NY, USA (2016): 833-841.

Surface Acoustic Wave (SAW) Touch Screen, baanto.com, 2017 [retrieved on Jun. 15, 2017] Retrieved from the Internet: <URL: https://web.archive.org/web/20170615202131/http://baanto.com/surface-acoustic-wave-saw-touch-screen> (3 pages).

Charvat, Gregory L. "Small and Short-Range Radar Systems." 1st Edition. CRC Press, Inc., Boca Raton, FL, USA (2014): 1-385.

Hu, Wenfei, et al. "Design and Measurement of Reconfigurable Millimeter Wave Reflectarray Cells With Nematic Liquid Crystal." IEEE Transactions on Antennas and Propagation 56.10 (2008): 3112-3117.

Carrasco, Eduardo, et al. "Gate-controlled mid-infrared light bending with aperiodic graphene nanoribbons array." Arxiv.org preprint, arXiv:1412.1061 (2014): 1-11.

Karmoose, Mohammed, et al. "Using mm-Waves for Secret Key Establishment." Arxiv.org preprint, arXiv:1803.08188v3 (2019): 1-8.

Mayrhofer, René, et al. "On the Security of Ultrasound as Out-of-band Channel." 2007 IEEE International Parallel and Distributed Processing Symposium. Rome, Italy (2007): 1-6.

Mayrhofer, René, et al. "Security by Spatial Reference: Using Relative Positioning to Authenticate Devices for Spontaneous Interaction." 9th International Conference on Ubiquitous Computing. Innsbruck, Austria (2007): 199-216.

Mayrhofer, René. "Ubiquitous Computing Security: Authenticating Spontaneous Interactions" Habilitation Thesis, University of Vienna (2008): 1-191.

Steinmetzer, Daniel, et al. "Authenticating the Sector Sweep to Protect Against Beam-Stealing Attacks in IEEE 802.11ad Networks." mmNets '18: Proceedings of the 2nd ACM Workshop on Millimeter Wave Networks and Sensing Systems, New Delhi, India (2018): 3-8.

(56) References Cited

OTHER PUBLICATIONS

Saxena, Nitesh, et al. "Treat 'Em Like Other Devices: User Authentication of Multiple Personal RFID Tags." Proceedings of the 5th Symposium on Usable Privacy and Security, SOUPS 2009, Mountain View, California, USA, (2009): 1-2.
Zhao, Nan, et al. "Authentication in Millimeter-Wave Body-Centric Networks Through Wireless Channel Characterization." IEEE Transactions on Antennas and Propagation 65.12 (2017): 6616-6623.
Final Office Action for U.S. Appl. No. 17/018,154; dated Jul. 10, 2023 (15 pages).
Non-Final Rejection for U.S. Appl. No. 17/018,154; dated Dec. 23, 2022 (28 pages).
Communication pursuant to Article 94(3) EPC for corresponding European application No. 18796037.2; dated Aug. 8, 2023 (7 pages).
First Office Action for corresponding Chinese application No. 201880099204.1; dated Jan. 4, 2024 (23 pages) Machine Translation.
Qi-Cai, He, et al., "The General Solution For The Problem Of A Plane Electromagnetic Wave Reflected And Transmitted From The Interface Between A Stationary Dielectric Medium And A Dielectric Medium Moving In An Arbitrary Direction" Acta Physica Sinnia 48.6 (1999): 1044-1051; English Abstract.

* cited by examiner

APPARATUS FOR REFLECTING ELECTROMAGNETIC WAVES AND METHOD OF OPERATING SUCH APPARATUS

CROSS-REFERENCE TO RELATED APPLICATIONS

This application claims the benefit of the filing date of PCT application no. PCT/EP2018/079863 of 31 Oct. 2018, the teachings of which are incorporated herein by reference.

TECHNICAL FIELD

The disclosure relates to techniques for transmission and reception of electromagnetic waves. One particular, and non-exclusive, example of application of such techniques relates to beam alignment in antennas.

BACKGROUND

It is known to use electromagnetic waves for wireless data exchange.

SUMMARY

Exemplary embodiments relate to an apparatus comprising at least one movable reflective surface configured to reflect electromagnetic waves and at least one actuator coupled with the at least one movable reflective surface, wherein said at least one actuator is configured to at least temporarily drive a movement of said at least one movable reflective surface. This advantageously enables to modulate electromagnetic waves impinging upon said at least one movable reflective surface while reflecting said electromagnetic waves.

According to further exemplary embodiments, by means of said modulation, information may be provided to the reflected electromagnetic waves that may be evaluated, for example by a receiver, i.e. a receiver of a transceiver that has emitted said electromagnetic waves impinging upon said at least one movable reflective surface and/or another receiver.

According to further exemplary embodiments, said at least one movable reflective surface is configured to reflect electromagnetic waves that have a frequency of 3 gigahertz, GHz, or greater and/or to reflect electromagnetic waves in the millimeter wave range.

Electromagnetic waves denoted as "millimeter waves" are electromagnetic waves having a wavelength ranging from 1 millimeter, mm, to 10 mm, corresponding to frequencies in a range between 300 GHz and 30 GHz. While some embodiments may be particularly suited for modulating and reflecting millimeter waves, the principle according to the embodiments is also applicable to electromagnetic waves having higher or lower frequencies than said millimeter waves.

According to further exemplary embodiments, said at least one movable reflective surface comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating).

According to further exemplary embodiments, said at least one actuator comprises at least one of: a piezoelectric element, a magnetostrictive element, an electroactive module (e.g., comprising an electroactive polymer), a piezoelectric film (e.g., a film comprising Polyvinylidene fluoride, PVDF).

According to further exemplary embodiments, said at least one movable reflective surface is a surface of said at least one actuator, which yields a particularly compact design.

According to further exemplary embodiments, said apparatus comprises at least one movable reflector element having said at least one reflective surface, wherein said actuator is configured to drive a movement of said at least one movable reflector element and/or of said at least one reflective surface. In other words, by driving e.g. an oscillation of said at least one movable reflector element, the oscillation of said at least one reflective surface for reflecting electromagnetic waves may be effected.

According to further exemplary embodiments, said at least one reflector element comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating)).

According to further exemplary embodiments, a plurality of movable reflecting surfaces configured to reflect said electromagnetic waves is provided.

According to further exemplary embodiments, said at least one actuator is configured to at least temporarily drive a movement, e.g. an oscillation, of at least one of said plurality of movable reflecting surfaces.

According to further exemplary embodiments, said plurality of movable reflecting surfaces may be arranged relative to each other in accordance with, i.e. similar to or identical to, polygonal faces of a polyhedron. As an example, a plurality of movable reflecting surfaces may be arranged on virtual surfaces of at least one of the following elements: a cuboid, an octahedron, a truncated octahedron, an icosahedron, a truncated icosahedron ("football shape"), pentagonal spherical shape. This enables to increase an isotropic operation regarding modulation and reflection of electromagnetic waves in three-dimensional (3D) space.

According to further exemplary embodiments, said at least one actuator is configured to at least temporarily drive a movement, e.g. an oscillation or a non-periodic movement, of more than one of said movable reflecting surfaces.

According to further exemplary embodiments, a plurality of actuators is provided, wherein each of said plurality of actuators is configured to at least temporarily drive a movement, e.g. an oscillation or a non-periodic movement, of at least one of said movable reflecting surfaces.

According to further exemplary embodiments, one actuator may be assigned to one or more movable reflecting surfaces and/or movable reflector elements.

According to further exemplary embodiments, one or more reflector elements are provided on said at least one movable reflective surface. Said reflector elements may enhance the reflective properties of said at least one reflective surface, particularly by broadening an effective cross-section for the reflection of incident electromagnetic waves. According to further exemplary embodiments, said reflector elements are configured such that they reflect and/or diffract an impinging electromagnetic wave more than once.

According to further exemplary embodiments, one or more reflector elements may be provided on at least one movable reflective surface or on various ones (or even all) of said movable reflective surfaces.

According to further exemplary embodiments, different movable reflective surfaces may be provided with different numbers and/or different types of reflector elements.

According to further exemplary embodiments, one or more reflector elements may comprise at least one of the following elements: a dihedral corner reflector, a spherical retroreflector cavity, a trihedral reflector, a polyhedral reflector.

According to further exemplary embodiments, at least one of said reflector elements comprises at least one of the following components: electrically conductive material, metal (e.g. aluminum, copper, silver, gold, and the like, e.g. in the form of metallic plates or pieces of sheet material), electrically isolating material with an electrically conductive surface (e.g., glass and/or plastic material, e.g. plastic sheets with an electrically conductive coating, e.g. metal coating).

According to further exemplary embodiments, a control unit is provided that is configured to apply a control signal to said at least one actuator.

According to further exemplary embodiments, the control signal comprises at least one frequency component in a range between 0 hertz, Hz, and 100 megahertz, MHz.

According to further exemplary embodiments, the control signal comprises at least one frequency component in a range between 100 Hz and 10 MHz. According to further exemplary embodiments, the control signal comprises at least one frequency component in a range between 1000 Hertz, (1 kHz), and 1 MHz.

As an example, the application of the control signal may cause the at least one actuator to alter at least one of its dimensions (length, width, height), which enables to move a movable reflector element attached to said actuator and/or a surface (e.g. reflective surface) of said actuator. This way, said at least temporarily driving a movement, e.g. an oscillation, of said at least one movable reflective surface may be effected.

According to further exemplary embodiments, the actuator may be configured to at least temporarily drive other types of movement of said at least one movable reflective surface than said oscillation, e.g. a non-periodic movement.

According to further exemplary embodiments, the control signal is used to modulate electromagnetic waves reflected at said at least one reflective surface. In other words, said at least one movable reflective surface may be used to mechanically modulate electromagnetic waves reflected at said at least one movable reflective surface.

According to further exemplary embodiments, a level of the control signal may be altered depending on a predetermined bit sequence, which enables to modulate the electromagnetic waves reflected at said at least one movable reflective surface depending on said bit sequence.

According to further exemplary embodiments, if more than one actuator is provided (e.g., for driving different reflective surfaces), said control unit is configured to at least temporarily apply different control signals to different actuators. This way, different modulation patterns may be applied to different actuators. According to further exemplary embodiments, different modulation patterns may be applied to different ones of a plurality of movable reflective surfaces, which may be oriented in different spatial directions, e.g. concerning their surface normal vectors.

According to further exemplary embodiments, said at least one movable reflective surface comprises a photovoltaic element, which enables to obtain electric energy from said movable reflective surface ("solar energy harvesting") thus contributing to energy autonomy of the apparatus. According to further exemplary embodiments, electric energy obtained by said photovoltaic element may be used to control said at least one actuator, and/or to supply any component of the apparatus, e.g. the control unit.

According to further exemplary embodiments, said reflector element comprises or is made of a photovoltaic element, e.g. (glass-)sealed solar cells.

According to further exemplary embodiments, said reflector element may comprise at least one active element other than a photovoltaic element, so that—in addition to modulation and reflection of incident electromagnetic waves—further functionality may be provided by said reflector element.

According to further exemplary embodiments, said at least one actuator is configured to at least temporarily drive a periodic movement or an oscillation of said at least one movable reflective surface.

Further exemplary embodiments feature a method of operating an apparatus comprising at least one movable reflective surface configured to reflect electromagnetic waves and at least one actuator coupled with the at least one movable reflective surface, particularly an apparatus according to the embodiments, wherein said method comprises: at least temporarily driving, by means of said actuator, a movement of said at least one reflective surface.

According to further exemplary embodiments, said at least one actuator at least temporarily drives a periodic movement or an oscillation of said at least one movable reflective surface.

According to further exemplary embodiments, other forms of movement or displacement, particularly non-periodic movements, of said at least one reflective surface may also be at least temporarily provided by means of said actuator.

According to further exemplary embodiments, said method further comprises mechanically modulating electromagnetic waves reflected at said at least one movable reflective surface. According to further exemplary embodiments, said oscillation may be altered (e.g., activated or deactivated) in accordance with a bit sequence.

According to further exemplary embodiments, at least one apparatus according to the embodiments may be used to modulate electromagnetic waves.

According to further exemplary embodiments, at least one apparatus according to the embodiments may be used to modulate electromagnetic waves, wherein different groups of electromagnetic waves incident from different spatial directions are modulated differently by said apparatus (e.g., by providing different control signals for driving respective movable reflective surfaces associated with said different spatial directions).

Further exemplary embodiments feature a radio device comprising a radio interface for wirelessly exchanging (e.g., transmitting and/or receiving) data with at least one further device, wherein said radio device comprises at least one apparatus according to the embodiments.

According to further exemplary embodiments, said radio device may comprise a radio interface having a transmitter and/or a receiver and/or a transceiver (combined transmitter and receiver) for wirelessly exchanging data with said at least one further device.

According to further exemplary embodiments, said radio device may be a router and/or a base station, especially a base station for a cellular communications system, and/or a mobile radio device.

According to further exemplary embodiments, said radio interface is configured to wirelessly exchange data with said at least one further device by means of electromagnetic waves that have a frequency of 3 gigahertz, GHz, or greater and/or electromagnetic waves in the millimeter wave range. While some embodiments of the radio device may be particularly suited for communicating using millimetre waves, the principle according to the embodiments is also applicable to radio devices using electromagnetic waves having higher or lower frequencies as compared to the millimeter waves.

According to further exemplary embodiments, said at least one apparatus according to the embodiments is preferably arranged on an outer surface of said radio device.

Further exemplary embodiments feature a radio device comprising a transmitter configured to transmit electromagnetic waves via an antenna system with a first beam characteristic to an apparatus according to the embodiments, a receiver configured to receive reflected modulated electromagnetic waves from said apparatus, wherein said radio device is configured to determine a second beam characteristic for said antenna system depending on said received reflected modulated electromagnetic waves.

According to further exemplary embodiments, said radio device is configured to perform further data transmissions to said apparatus (and/or a device to which said apparatus is attached or comprising said apparatus) with said second beam characteristic. According to further exemplary embodiments, said radio device is configured to determine said second beam characteristic by means of direction of arrival (DOA) analysis based on said received reflected signal.

Further exemplary embodiments feature a radio system comprising a radio device according to some embodiments and at least one further radio device. According to further exemplary embodiments, said further radio device may be a radio device comprising at least one apparatus and/or a radio device according to some embodiments.

Further exemplary embodiments feature a method of operating a radio system according to the embodiments, said method comprising: transmitting a first signal from said further radio device via an antenna system with a first beam characteristic to said radio device, mechanically modulating and reflecting, by said radio device, at least a portion of said first signal.

According to further exemplary embodiments, said first signal may comprise a pulse compression linear frequency modulation (PC-LFM) signal.

According to further exemplary embodiments, said method may further comprise the further radio device receiving the reflected signal which has been mechanically modulated and reflected by said radio device by means of the apparatus according to the embodiments.

According to further exemplary embodiments, said method may further comprise the further radio device performing a direction of arrival (DOA) analysis based on said received reflected signal.

According to further exemplary embodiments, said method may further comprise the further radio device performing a wireless data transmission to said radio device, wherein an antenna characteristic of an antenna system of the further radio device is configured depending on said DOA analysis. According to further exemplary embodiments, said further radio device may comprise an antenna system with (electrically and/or mechanically) controllable beam pattern such as a one-dimensional uniform linear array (ULA) or two-dimensional uniform rectangular array (URA).

According to further exemplary embodiments, based on said DOA analysis, said further radio device may configure its antenna characteristic, particularly a beam pattern, such that a main lobe or beam is directed to said radio device. This way, the further radio device may immediately commence a directed data transmission to the radio device according to the embodiments, i.e. using an antenna beam pointed in the direction of said radio device.

Further advantageous embodiments are provided by the dependent claims.

BRIEF DESCRIPTION OF THE FIGURES

Further features, aspects and advantages of the illustrative embodiments are given in the following detailed description with reference to the drawings in which.

DETAILED DESCRIPTION

Figure 1:
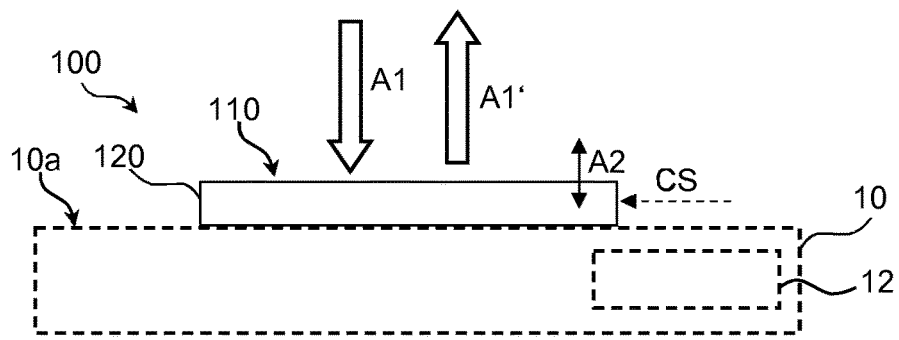
FIG. 1 schematically depicts a side view of an apparatus according to exemplary embodiments, FIG. 2 schematically depicts a simplified block diagram of an actuator according to further exemplary embodiments, FIG. 3 schematically depicts a side view of an apparatus according to further exemplary embodiments, FIG. 4A schematically depicts a side view of an apparatus according to further exemplary embodiments, FIG. 4B schematically depicts a top view of the apparatus according to FIG. 4A, FIGS. 5A, 5B, 5C each schematically depict a perspective view of an apparatus according to further exemplary embodiments, FIGS. 6A, 6B, 6C each schematically depict a reflector element according to further exemplary embodiments, FIG. 7 schematically depicts a simplified block diagram of a radio system according to further exemplary embodiments, FIG. 8 schematically depicts signals according to further exemplary embodiments, FIG. 9 schematically depicts parameters and signals according to further exemplary embodiments, FIG. 10A schematically depicts a signal space according to further exemplary embodiments, FIG. 10B schematically depicts a signal space according to further exemplary embodiments, FIG. 11 schematically depicts a simplified flow-chart of a method according to exemplary embodiments, FIG. 12 schematically depicts a simplified flow-chart of a method according to further exemplary embodiments, and FIG. 13 schematically depicts a simplified flow-chart of a method according to further exemplary embodiments.

FIG. 1 schematically depicts a side view of an apparatus 100 according to exemplary embodiments. The apparatus 100 comprises at least one movable reflective surface 110 configured to reflect incident electromagnetic waves A1 and at least one actuator 120 coupled with the at least one movable reflective surface 110, wherein said at least one actuator 120 is configured to at least temporarily drive a movement, e.g. an oscillation A2 (or any other type of movement enabled by said actuator 120), of said at least one movable reflective surface 110. For this purpose, the actuator 120 may at least temporarily be provided with a control signal CS. This advantageously enables to modulate the electromagnetic waves A1 impinging upon said at least one reflective surface 110 and consequently reflecting said electromagnetic waves as modulated reflected electromagnetic waves A'.

According to further exemplary embodiments, by means of said modulation, information may be provided to the reflected electromagnetic waves A1' that may be evaluated, for example by a receiver (not shown in FIG. 1), i.e. a receiver of a transceiver that has emitted said electromagnetic waves A1 impinging upon said at least one reflective surface 110 and/or another receiver.

Figures 11, 12, 13:
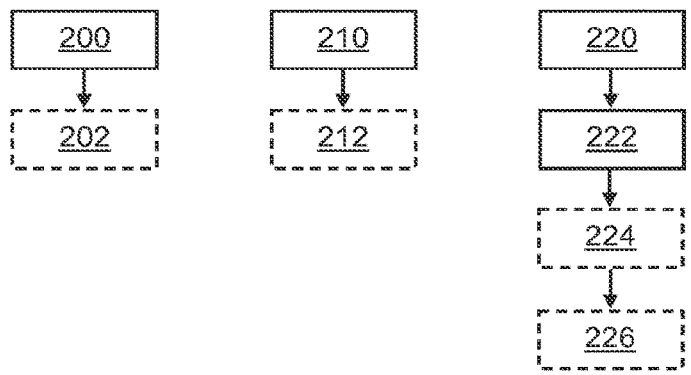

FIG. 11 schematically depicts a simplified flow-chart of a method according to exemplary embodiments. In step 200, the actuator 120 (FIG. 1) drives an oscillation (or generally, any type of movement) of said movable reflective surface 110. In a subsequent, optional, step 202, the actuator 120 does not drive said oscillation (or said movement) any more. Alternatively, in optional step 202, another type of oscillation (e.g., with different frequency) or movement may be provided.

Alternatively or additionally to at least temporarily driving said oscillation, other forms of movement or displacement, particularly non-periodic movements, of said at least one movable reflective surface 110 may also be at least temporarily provided by means of said actuator 120.

According to further exemplary embodiments, said method further comprises mechanically modulating electromagnetic waves A1, A1' (FIG. 1) reflected at said at least one movable reflective surface 110. According to further exemplary embodiments, said oscillation may be altered (e.g., activated or deactivated) in accordance with a bit sequence. Details related to such bit sequence are explained further below with reference to FIG. 9.

According to further exemplary embodiments, at least one apparatus according to the embodiments may be used to modulate electromagnetic waves, e.g. by performing the steps 200 and/or 202 as explained above with reference to FIG. 11.

According to further exemplary embodiments, said at least one movable reflective surface 110 is configured to reflect electromagnetic waves A1 that have a frequency of 3 gigahertz, GHz, or greater and/or to reflect electromagnetic waves A1 in the millimeter wave range.

Electromagnetic waves denoted as "millimeter waves" are electromagnetic waves having a wavelength ranging from 1 millimeter, mm, to 10 mm, corresponding to frequencies in a range between 300 GHz and 30 GHz. While some embodiments may be particularly suited for modulating and reflecting millimeter waves A1, the principle according to the embodiments is also applicable to electromagnetic waves having higher or lower frequencies than said millimeter waves.

According to further exemplary embodiments, said at least one movable reflective surface 110 comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating).

The apparatus 100 may be arranged on and/or attached to a surface 10a of a target system 10. According to further exemplary embodiments, the target system 10 may be any object or device 10 (mobile or fixed) for which it may be desirable to reflect incident electromagnetic waves while modulating said incident electromagnetic waves in accordance with the principle according to the embodiments.

According to some exemplary embodiments, the device 10 may be a radio device comprising a radio interface 12 for wirelessly exchanging (e.g., transmitting and/or receiving) data with at least one further device (not shown in FIG. 1).

According to further exemplary embodiments, said radio device 10 may comprise a radio interface 12 having a transmitter and/or a receiver and/or a transceiver (combined transmitter and receiver) for wirelessly exchanging data with said at least one further device.

According to further exemplary embodiments, said radio device 10 may be a router and/or a base station, especially a base station for a cellular communications system, and/or a mobile radio device.

Figure 2:
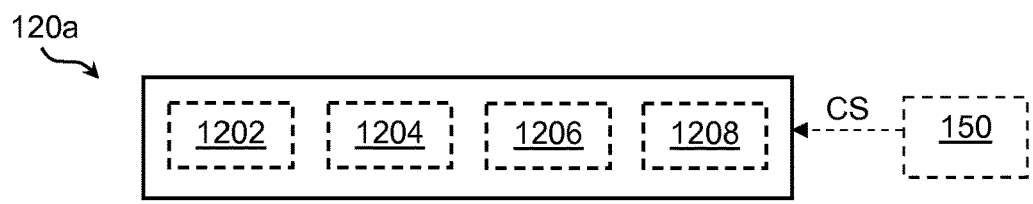

FIG. 2 schematically depicts an actuator 120a according to further exemplary embodiments. As an example, actuator 120 of FIG. 1 may comprise the configuration 120a of FIG. 2. The actuator 120a comprises at least one of: a piezoelectric element 1202, a magnetostrictive element 1204, an electroactive module 1206 (e.g., comprising an electroactive polymer), a piezoelectric film 1208 (e.g., a film comprising Polyvinylidene fluoride, PVDF).

Optionally, a control unit 150 may be provided for applying said control signal CS to the actuator 120a. As an example, in the case of a piezoelectric element 1202, the control signal CS may comprise an electric voltage, preferably a time-varying electric voltage.

Returning to FIG. 1, according to further exemplary embodiments, said at least one movable reflective surface 110 is a movable surface of said at least one actuator 120, which yields a particularly compact design.

Figure 3:
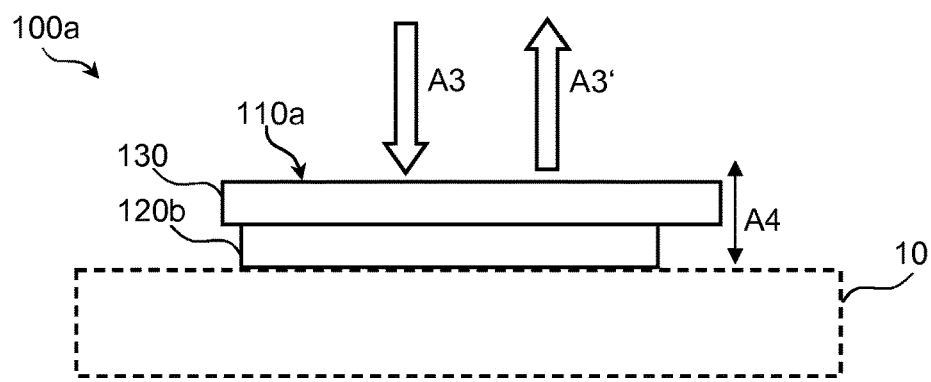

According to further exemplary embodiments, cf. the apparatus 100a of FIG. 3, said apparatus 100a comprises at least one movable reflector element 130 having at least one reflective surface 110a, wherein said actuator 120b is configured to drive an oscillation or any other type of movement A4 of said at least one movable reflector element 130 and/or of said at least one reflective surface 110a. In other words, by driving an oscillation of said at least one reflector element 130, the oscillation of said at least one reflective surface 110a for reflecting electromagnetic waves A3, A3' may be effected.

According to further exemplary embodiments, said at least one reflector element 130 comprises at least one of the following components: electrically conductive material, metal (e.g., aluminum, copper, silver, gold, and the like), electrically isolating material with an electrically conductive surface (e.g., glass and/or plastic material, e.g. plastic sheets, with an electrically conductive coating, e.g. metal coating)).

Figure 4A:
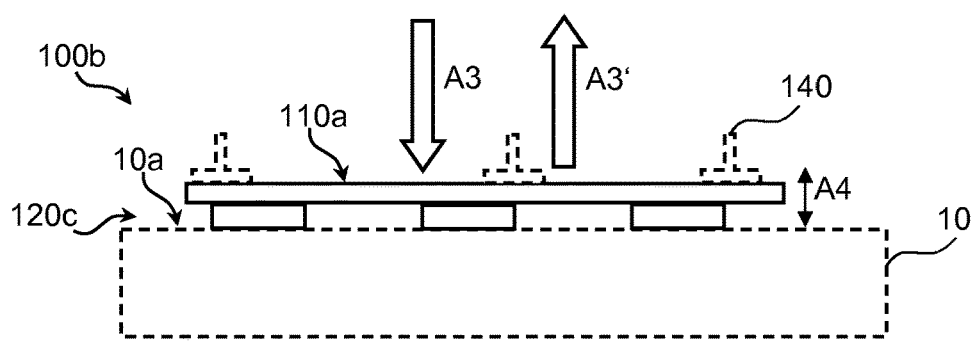
Figure 4B:
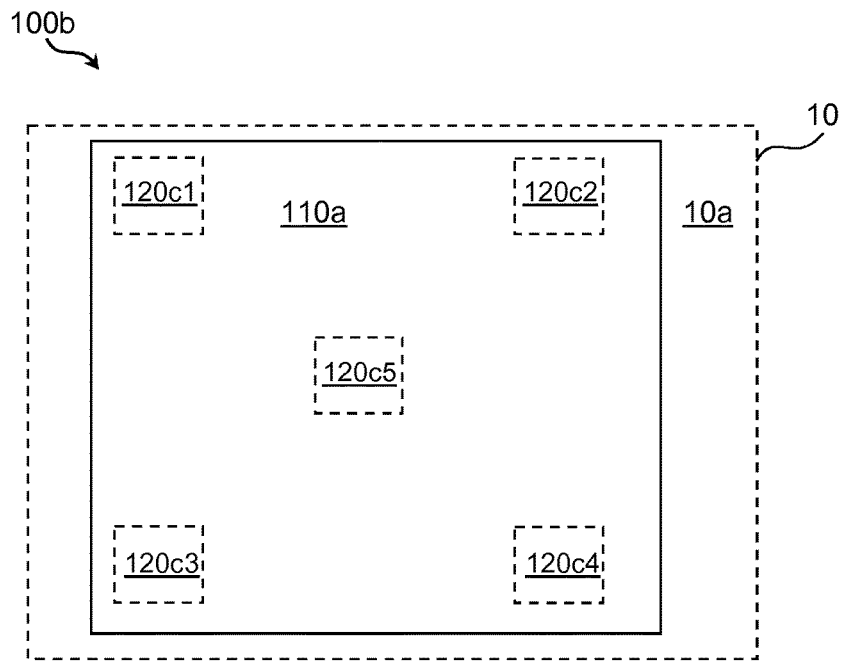

FIG. 4A schematically depicts a side view of an apparatus 100b according to further exemplary embodiments, and FIG. 4B schematically depicts a top view of said apparatus 100b. The apparatus 100b comprises five actuators 120c1, 120c2, 120c3, 120c4, 120c5 collectively denoted with reference sign 120c in FIG. 4A. A movable reflective surface 110a (or a reflector element having a reflective surface 110a) is arranged on top of the actuators 120c and may thus be moved (e.g., in the sense of an oscillation A4) as explained above to effect a mechanical modulation of incident electromagnetic waves A3, whereby mechanically modulated electromagnetic waves A3' are obtained.

According to further exemplary embodiments, one or more reflector elements 140 are provided on said at least one reflective surface 110a. Said reflector elements 140 may enhance the reflective properties of said at least one reflective surface 110a, particularly by broadening an effective cross-section for the reflection of incident electromagnetic waves.

Further details related to the reflector elements 140 are provided further below with reference to FIG. 6.

According to further exemplary embodiments, a plurality of movable reflecting surfaces configured to reflect said electromagnetic waves is provided. In this regard, FIG. 5A depicts an apparatus 100c having basically cuboid shape, wherein two surfaces 110a, 110b are movable reflective surfaces each of which may be actuated for oscillation and/or any other type of movement for modulating incident electromagnetic waves (cf. the antiparallel arrows) either individually (by a respective actuator 120, cf. FIG. 1) or commonly (by a common actuator).

FIG. 12 schematically depicts a simplified flow-chart of a method according to exemplary embodiments. In step 210, a first actuator (not shown), which is associated with said first reflective surface 110a, drives an oscillation (or generally, any type of movement) of said first movable reflective surface 110a. In a further, optional, step 212, a further actuator (not shown), which is associated with said second reflective surface 110b, drives an oscillation (or generally, any type of movement) of said second movable reflective surface 110b. The exemplary steps 210, 212 may also be carried out in another sequence or simultaneously. According to further exemplary embodiments, at least one of said steps 210, 212 may also be repeated, e.g. periodically.

Figure 5A:
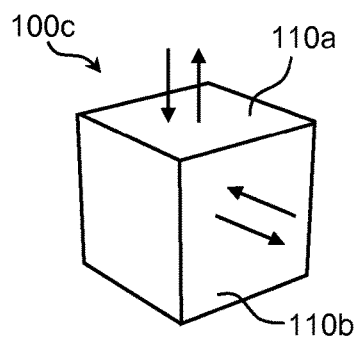
Figure 5B:
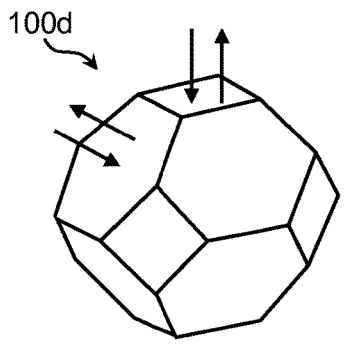

FIG. 5B depicts an apparatus 100d according to further exemplary embodiments having truncated octahedron shape, wherein, similar to FIG. 5A, two actuatable reflective surfaces are provided. Any other number of actuatable reflective surfaces is also possible according to further embodiments.

Figure 5C:
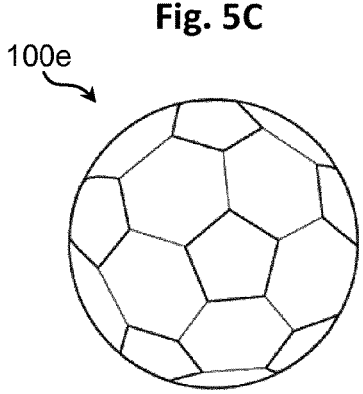

FIG. 5C depicts an apparatus 100e according to further exemplary embodiments having truncated icosahedron shape, wherein one or more actuatable reflective surfaces are provided.

As mentioned above, according to further exemplary embodiments, said at least one actuator 120, 120c (FIGS. 1, 4A, 4B) is configured to at least temporarily drive an oscillation (or any other movement) of more than one of said reflecting surfaces 110a, 110b (FIG. 5A).

According to further exemplary embodiments, a plurality of actuators (not shown) is provided, wherein each of said plurality of actuators is configured to at least temporarily drive an oscillation of at least one of said movable reflecting surfaces 110a, 110b.

According to further exemplary embodiments, one actuator may be assigned to one or more movable reflecting surfaces and/or movable reflector elements.

The embodiments of FIG. 5A to 5C or generally any apparatus with more than one reflective surface, wherein different surfaces are directed into different spatial directions, enable special isotropy of operation which is useful e.g. for fast moving objects and applications in gaming and automotive industries where communication nodes are moving in 3D space and time.

Figure 6A:
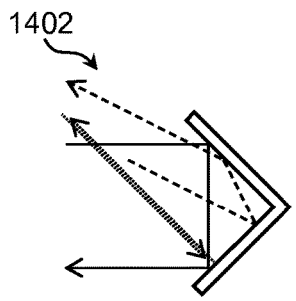
Figure 6B:
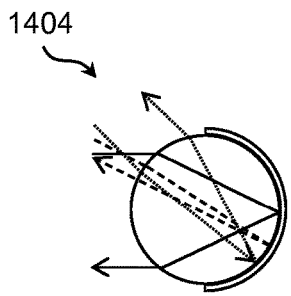
Figure 6C:
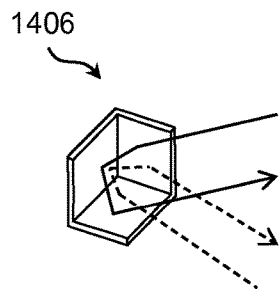

According to further exemplary embodiments, cf. FIGS. 6A, 6B, 6C, one or more reflector elements (also cf. reference sign 140 of FIG. 4A) are provided on said at least one reflective surface 110a. Said reflector elements may enhance the reflective properties of said at least one reflective surface, particularly by broadening an effective cross-section for the reflection of incident electromagnetic waves. According to further exemplary embodiments, said reflector elements are configured such that they reflect and/or diffract an impinging electromagnetic wave more than once.

In this regard, FIG. 6A schematically depicts a side view of a dihedral corner reflector 1402, FIG. 6B schematically depicts a side view of a spherical retroreflector cavity 1404, and FIG. 6C schematically depicts a perspective view of a trihedral reflector 1406. The various arrows of FIGS. 6A, 6B, 6C exemplarily depict paths of reflected electromagnetic waves to illustrate the effect of the reflector elements.

According to further exemplary embodiments, if more than one reflective surface 110a, 110b (FIG. 5A) is provided, one or more reflector elements may be provided on at least one reflective surface 110a, 110b or on various ones (or even all) of said reflective surfaces.

According to further exemplary embodiments, different reflective surfaces 110a, 110b may be provided with different numbers and/or different types of reflector elements 1402, 1404, 1406.

According to further exemplary embodiments, at least one of said reflector elements 140, 1402, 1404, 1406 comprises at least one of the following components: electrically conductive material, metal (e.g. aluminum, copper, silver, gold, and the like, e.g. in the form of metallic plates or pieces of sheet material), electrically isolating material with an electrically conductive surface (e.g., glass and/or plastic material, e.g. plastic sheets with an electrically conductive coating, e.g. metal coating).

According to further exemplary embodiments, the control signal CS (FIGS. 1, 2) provided by the control unit 150 comprises at least one frequency component in a range between 0 hertz, Hz, and 100 megahertz, MHz.

According to further exemplary embodiments, the control signal CS comprises at least one frequency component in a range between 100 Hz and 10 MHz. According to further exemplary embodiments, the control signal CS comprises at least one frequency component in a range between 1000 Hertz, (1 kHz), and 1 MHz.

As an example, the application of the control signal CS may cause the at least one actuator 120 (FIG. 1) to alter at least one of its dimensions (length, width, height), which enables to move (cf. double arrow A2) the reflector element attached to said actuator and/or a surface 110 (e.g. reflective surface) of said actuator 120.

According to further exemplary embodiments, the actuator 120 (or at least one actuator of a plurality 120c of actuators) may be configured to at least temporarily drive other types of movement of said at least one reflective surface than said oscillation, e.g. a non-periodic movement.

According to further exemplary embodiments, the control signal CS (FIG. 1) is used to modulate electromagnetic waves A1, A1' reflected at said at least one reflective surface 110. In other words, said at least one reflective surface 110 may be used to mechanically modulate electromagnetic waves A1, A1' reflected at said at least one reflective surface 110.

According to further exemplary embodiments, said at least one reflective surface 110 (FIG. 1) comprises a photovoltaic element, which enables to obtain electric energy from said reflective surface ("solar energy harvesting"). According to further exemplary embodiments, electric energy obtained by said photovoltaic element may be used to control said at least one actuator, and/or to supply any component of the apparatus, e.g. the control unit 150.

According to further exemplary embodiments, said reflector element 130 (FIG. 3) comprises or is made of a photovoltaic element, e.g. (glass-)sealed solar cells.

According to further exemplary embodiments, said reflector element 130 may comprise at least one active element other than a photovoltaic element, so that—in addition to modulation and reflection of incident electromagnetic waves—further functionality may be provided by said reflector element 130.

Figure 7:
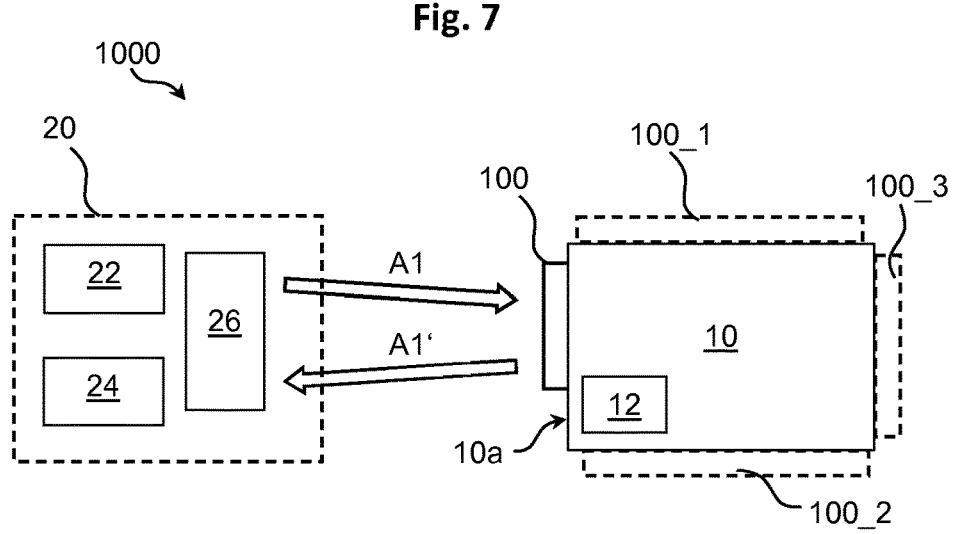

Further exemplary embodiments feature a radio device 10 (FIG. 7) comprising a radio interface 12 for wirelessly exchanging (e.g., transmitting and/or receiving) data with at least one further radio device 20, wherein said radio device 10 comprises at least one apparatus 100 according to the embodiments. The radio device 10 may form a part of a radio system 1000 comprising the radio device 10 and at least one further radio device 20.

According to further exemplary embodiments, said radio device 10 may comprise a radio interface 12 having a transmitter and/or a receiver and/or a transceiver (combined transmitter and receiver) for wirelessly exchanging data with said at least one further device 20.

According to further exemplary embodiments, said radio device may be a router and/or a base station, especially a base station for a cellular communications system, and/or a mobile radio device.

According to further exemplary embodiments, said radio interface 12 is configured to wirelessly exchange data with said at least one further device 20 by means of electromagnetic waves that have a frequency of 3 gigahertz, GHz, or greater and/or electromagnetic waves in the millimeter wave range. While some embodiments of the radio device may be particularly suited for communicating using millimeter waves, the principle according to the embodiments is also applicable to radio devices using electromagnetic waves having higher or lower frequencies as compared to the millimeter waves.

According to further exemplary embodiments, said at least one apparatus 100 according to the embodiments is preferably arranged on an outer surface 10a (FIG. 7) of said radio device 10. Further apparatus 100_1, 100_2, 100_3 having identical or similar configuration compared to the apparatus 100, 100a, 100b, 100c, 100d, 100e explained above may also be provided at the radio device 10.

The further radio device 20 may be a conventional radio device having a transmitter 22 and a receiver 24, and an antenna system 26 which may e.g. be used by the transmitter 22 and the receiver 24. According to further exemplary embodiments, said further radio device 20 may be a radio device according to the embodiments, i.e. also comprising at least one apparatus according to the embodiments (not shown).

Further exemplary embodiments feature a method of operating the radio system 1000, also cf. the flow-chart of FIG. 13. The method comprises, as a first step 220 (FIG. 13), transmitting a first signal of electromagnetic waves A1 (FIG. 7) from said further radio device 20 to said radio device 10, reflecting and thus mechanically modulating (step 222 of FIG. 13), by said radio device 10 (or its apparatus 100, respectively), at least a portion of said first signal A1, whereby the reflected modulated signal A1' is obtained.

Optionally, said method may further comprise a step 224 (FIG. 13) of receiving the reflected modulated signal A1' at the receiver 24 of the further radio device 20.

Further optionally, said method may comprise a step 226, i.e. the further radio device 20 performing a direction of arrival (DOA) analysis based on said received reflected signal A1'.

Figure 8:
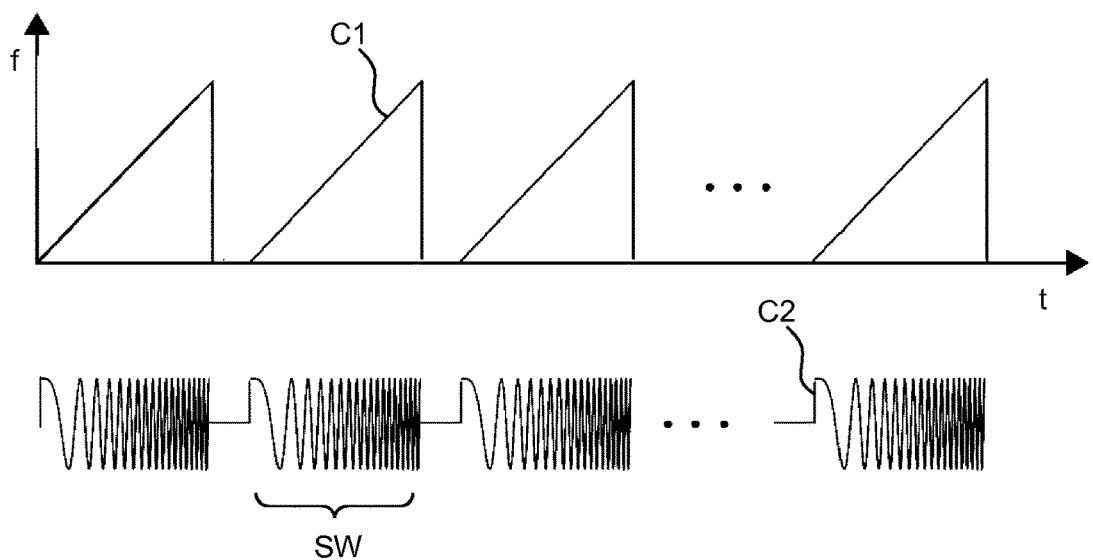

According to further exemplary embodiments, said first signal A1 may comprise a pulse compression linear frequency modulation (PC-LFM) signal, an example of which is depicted by curve C2 of FIG. 8. According to further exemplary embodiments, said PC-LFM signal C2 may be obtained by modulating a frequency of a carrier signal in accordance with the sawtooth signal of curve C1 of FIG. 8 (i.e., low to high frequency for each pulse). As an example, for a transmission signal in the 60 GHz band, such pulse may comprise a frequency sweep of 7 GHz. Alternatively to curve C1, a sequence of upward saw-tooth pulses (as depicted by C1) and downward saw-tooth pulses (not depicted) may be used, effecting an increasing and subsequently decreasing frequency of said pulses. Additionally, FIG. 8 depicts an exemplary sample window SW for a PC-LFM pulse according to further embodiments.

According to further exemplary embodiments, said method may further comprise the further radio device 20 (FIG. 7) performing a wireless data transmission to said radio device 10, wherein an antenna characteristic of an antenna system 26 of the further radio device 20 is configured depending on said DOA analysis. According to further exemplary embodiments, said further radio device 20 may comprise an antenna system 26 with (electrically and/or mechanically) controllable beam pattern such as a one-dimensional uniform linear array (ULA) or two-dimensional uniform rectangular array (URA).

According to further exemplary embodiments, based on said DOA analysis, said further radio device 20 may configure the antenna characteristic, particularly a beam pattern, of its antenna system 26 such that a main lobe or beam is directed to said radio device 10. This way, the further radio device 20 may immediately commence a directed data transmission to the radio device 10 according to the embodiments, i.e. using an antenna beam pointed in the direction of said radio device 10.

According to further exemplary embodiments, assuming that in an initial state of the system 1000 (FIG. 7), a position of the radio device 10 relative to the further radio device 20 is not known or not sufficiently precisely known, for said step 220 (FIG. 13) of transmitting the first signal of electromagnetic waves A1 (FIG. 7) from said further radio device 20 to said radio device 10, a first antenna characteristic or beam pattern with a comparatively low directivity may be used, taking into account the lack of knowledge regarding the position of the radio device 20. Once the modulated reflected signal A1' is received at said further radio device 20, cf. step 222, a DOA analysis may be performed by the further radio device 20 in step 224, thus gaining knowledge of the relative position of radio device 10 with respect to further radio device 20. After that, i.e. for further transmissions to said radio device 10, a second antenna characteristic or beam pattern with a comparatively high directivity may be used for the antenna system 26, wherein the main beam may be precisely directed at said radio device 10. This way, an efficient beam setup for wireless data transmission from the further radio device 20 to the radio device 10 may be performed. Once the beam setup is completed, a regular data transmission between devices 10, 20 may be performed. For this purpose, devices 10, 20 may use their transmitters and/or receivers and/or transceivers. According to further exemplary embodiments, once the beam setup is completed, the apparatus 100 is at least temporarily deactivated in order not to interfere with said regular data transmission. However, according to further exemplary embodiments, apparatus 100 may, preferably periodically, be used to perform a further beam setup, i.e. to compensate for drift effects and/or relative movement of the devices 10, 20 and the like. These embodiments are particularly useful for a precise and efficient antenna alignment.

According to further exemplary embodiments, a level of the control signal CS (FIG. 1) for the actuator 120 may be altered depending on a predetermined bit sequence, which enables to modulate the electromagnetic waves A1 (FIG. 1) reflected at said at least one reflective surface 110 depending on said bit sequence. In this regard, FIG. 9 exemplarily shows in a first row R1 a bit index for such bit sequence, shows in a second row R2 a saw-tooth signal indicating a periodic frequency change of the transmitted signal associated with the electromagnetic waves A1 (FIG. 1), and a third row R3 of FIG. 9 comprises an exemplary bit sequence which may be used as a mechanical modulation sequence for modulating the electromagnetic waves A1 reflected by said reflective surface 110. As an example, a signal level of the control signal CS may be derived from the bit sequence of row R3 of FIG. 9.

According to further exemplary embodiments, if more than one actuator is provided (e.g., for driving different reflective surfaces 110a, 110b, cf. e.g. FIG. 5A), said control unit 150 (FIG. 2) is configured to at least temporarily apply different control signals to said different actuators. This way, different modulation patterns (e.g. different bit patterns similar to row R3 of FIG. 9) may be applied to different actuators. According to further exemplary embodiments, different modulation patterns may be applied to different ones of a plurality of reflective surfaces, which may be oriented in different spatial directions, e.g. concerning their surface normal vectors. Thus, information related to an orientation of the apparatus according to the embodiments relative to a further radio device 20 may be derived by the further radio device 20.

According to further exemplary embodiments, at least one apparatus 100, 100a, . . . , 100e according to the embodiments may be used to modulate electromagnetic waves, wherein different groups of electromagnetic waves incident from different spatial directions are modulated differently by said apparatus (e.g., by providing different control signals for driving respective reflective surfaces associated with said different spatial directions).

The principle according to the embodiments may advantageously be used together with millimeter-wave (mm-wave) signals A1, A1'. As mm-wave communication systems usually require focused beams between communication nodes in order to sustain high throughput communications (due to mm-wave frequencies experiencing high free space path loss and being less able to diffract around objects compared to lower RF (radio frequency) frequencies), the principle according to the embodiments may advantageously be used with such (and other) systems to enable an efficient and precise beam setup.

By applying the principles according to the embodiments, the challenging task of beam setup and management in mm-wave systems may be improved.

In some mm-wave systems, predominately, beamforming is achieved through protocol-level control between two nodes (in 3D space) i.e. medium access control (MAC). In a nutshell, two nodes may electronically steer their beams to maximize their signal-to-noise ratios. Due to the back-and-forth feedback, this is a lengthy process with beam setup times of the order of hundreds of milliseconds. The overhead of beam setup of such systems is particularly problematic for dynamic scenarios such as moving people indoors or even faster moving objects such as cars, bikers, etc.

In this regard, the principle according to the embodiments enables an efficient beam setup without requiring MAC layer communication overhead for beam setup. As already explained above with reference to FIG. 7, considering a radio system 1000 with two nodes or radio devices 10, 20 which wish to communicate via mm-wave, device 20 may first transmit a mm-wave signal A1 which impinges on device 10. Device 10 comprises an apparatus 100 according to the embodiments with a reflective surface 110 (FIG. 1) that is mechanically modulated by actuator 120 so that reflected echoes A1' (FIG. 7) of the signal A1 can be identified by the antenna system 26 (e.g., a multi-antenna sensing receiver) at the device 20. A direction of arrival (DOA) can be inferred from the reflected signal A1' at the device 20, and device 20 can immediately commence a mm-wave transmission for data communication to device 10 using a beam pointed in that direction based on knowledge from the DOA analysis.

By supporting and conducting the directional acquisition using native sensing at the physical layer (PHY) as opposed to the MAC, exemplary embodiments offer a considerable advantage over such mm-wave systems (e.g., IEEE 802.11ad) by reducing the beam setup overhead by an order of magnitude.

One further advantage of exemplary embodiments is the application of actuators 120 with compact form factors, based on smart materials such as piezoelectric films, electroactive polymers, or magnetostrictive actuators, to enable the mechanical modulation on the reflective surface 110 of the apparatus 100. Specifically, according to further exemplary embodiments, vibrating reflective surfaces 110 may be provided by using piezoelectric materials which could resonate in microsecond or millisecond time scales to create unique modulation sequences for a given apparatus or at least one reflective surface 110, 110a, 110b of such apparatus.

According to further exemplary embodiments, infrastructure related to mm-wave communications (e.g., routers, bases stations, or mobile network transmitters/receivers or any other device 10, 20) may be equipped with at least one apparatus according to the embodiments, e.g. comprising a single or plurality of active oscillating/vibrating reflective surfaces 110, 110a, 110b. According to further exemplary embodiments, piezo-based transducers, which are currently gaining energy efficiency, may be used as actuator(s) 120, and the control circuit 150 (FIG. 2) may comprise one or more piezo driver integrated circuits (ICs), thus providing an energy efficient way to mechanically stimulate relatively larger physical surfaces 110.

According to further exemplary embodiments, by means of said actuator 120 (FIG. 1), the reflective surface 110 may be actuated such that e.g. a pi/2 phase offset (e.g. 1.25 mm at 60 GHz) may be imparted on an impinging electromagnetic wave A1 (FIG. 1) on microsecond or millisecond time scales. This active mechanical modulation of the reflective surface 110 will in turn modulate the signal A1, e.g. an mm-wave radar signal, giving the reflected echoes A1' a unique signature. Modulation sequences according to further exemplary embodiments have already been explained above with reference to FIG. 9. In this regard, assuming a perfect synchronization between the devices 10, 20, in each repetition interval, a bit value (cf. row R3 of FIG. 9) dictates a mechanical phase the reflective surface 110 (FIG. 1) of apparatus 100 of device 10 will impart on the impinging signal A1 from device 20. The reflections A1' reflected back to device 20 will consequently be modulated with such mechanical phase.

Figure 10A:
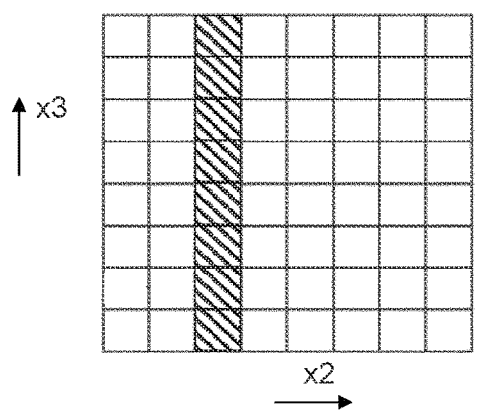
Figure 10B:
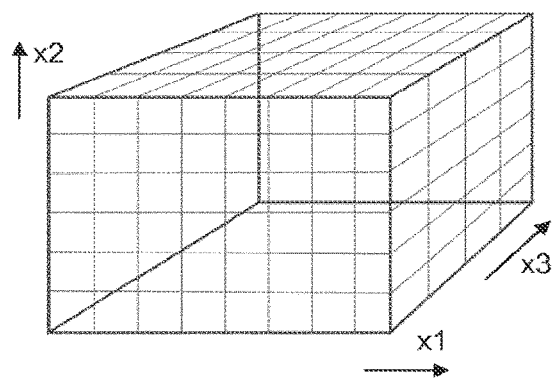

According to further exemplary embodiments, the receiver 24 (FIG. 7) may be configured to sample the baseband signal fast in order to capture an equally fast wideband modulation of the pulses, cf. curve C2 of FIG. 8. As such, without loss of generality, it can be assumed that the effect of the relative speed of the devices 10, 20 with respect to each other is negligible during the ramp rise of the sawtooth signal C1 (FIG. 8), i.e. stationary. According to further exemplary embodiments, inferring the Doppler effect may then be conducted in the so-called slow-time as depicted in FIG. 10A by the receiver 24 of the device 20. Note that in FIG. 10A, the horizontal x2 axis represents a fast-time axis and the vertical axis x3 represents the slow-time axis. According to further exemplary embodiments, by using fast-time and slow-time processing, the receiver 24 may decouple range and range rate (i.e. velocity) ambiguities. When considering a multi-antenna system 26 (FIG. 7), the 2D matrix of slow-time & fast-time processing of FIG. 10A becomes a so-called cube as illustrated in FIG. 10B with axis x1 representing spatial sampling (due to the multi-antenna system), axis x2 representing the fast-time axis, and axis x3 representing the slow-time axis.

According to further exemplary embodiments, the receiver 24 may perform target detection, which e.g. involves a multidimensional search in range, Doppler (range rate), and direction-of-arrival (DOA). If targets are ambiguous in one dimension such as range, they can still be separated by considering other detection dimensions by the receiver 24.

According to further exemplary embodiments, the further radio device 20 may perform signal analysis, based on the received reflected signal A1', in slow-time to ascertain the presence of the radio device 10 at range r and azimuth direction theta, e.g. assuming a 1D uniform linear array (ULA) 26. According to further exemplary embodiments, additionally, slow-time Doppler analysis with the exemplary code "11010011" will result in a peak reflecting the mechanical vibration, as this bit sequence has been used by the apparatus 100 of device 10 for modulating the signal A1.

According to further exemplary embodiments, in a general case where a synchronization between the devices 10, 20 cannot be assumed, the asynchronous search may be treated as a code acquisition problem similar to GPS (Global Positioning System) techniques.

According to further exemplary embodiments, depending on the type of the target system 10, 20 for the apparatus, the characteristic parameters of the control signal CS for controlling the actuator 120 and thus the movement, particularly oscillation, of the at least one reflective surface 110 (FIG. 1) may be chosen. As an example, for indoor scenarios assuming comparatively slow human movement, saw-tooth pulses (FIG. 9, row R2) of 100 microseconds or even millisecond timescales may be chosen, while for fast moving objects such as cars or other vehicles, saw-tooth pulses of microseconds duration and correspondingly fast piezo actuators for accurate estimation may be chosen.

According to further exemplary embodiments, the transmitter 22 (FIG. 7) providing the signal A1 and the modulator represented by the oscillating surface 110 can, in general, have sequences of different lengths. According to further exemplary embodiments, the transmitter 22 can have a sequence of up and/or down pulses.

Figure 9:
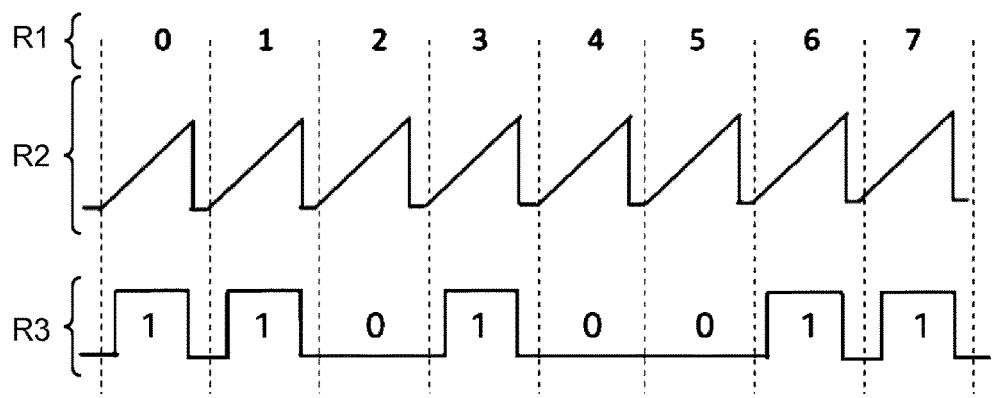

According to further exemplary embodiments, the radio device 10 (FIG. 7) may be enhanced by providing further, optional apparatus 100_1, 100_2, 100_3 each providing differently modulated surfaces 110 (FIG. 1), e.g. using different bit sequences R3 (FIG. 9). The detected surface of device 10 could be communicated from device 20 (that has performed the detection by analysing the reflected signal A1') to the device 10, e.g. indicating the direction of device 20 with respect to device 10.

According to further exemplary embodiments, the process as explained above with reference to FIG. 7 may be reciprocal so that the device 10 may determine the direction of device 20 via mechanical modulation by an apparatus (not shown) provided on a respective surface of the device 20.

According to further exemplary embodiments, a single transmission A1 may be reflected by multiple apparatus 100, and the direction of each apparatus could be determined independently by demodulating a unique modulation sequence associated with each apparatus. According to further embodiments, the device providing the transmission A1 and the device receiving the reflected modulated signal A1' may be identical or different devices.

According to further exemplary embodiments, if several apparatus 100 are provided and/or several devices 10, 20 performing a detection as explained above with respect to FIGS. 7, 13, the relative location of all apparatus and/or devices, e.g. with respect to a set of devices with prior known locations, may be determined using angle-of-arrival localization techniques known in the field.

The description and drawings merely illustrate the principles of exemplary embodiments. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of exemplary embodiments and the concepts contributed by the inventor(s) to furthering the art, and are to be construed as being without limitation to such specifically recited examples and conditions. Moreover, all statements herein reciting principles, aspects, and embodiments, as well as specific examples thereof, are intended to encompass equivalents thereof.

It should be appreciated by those skilled in the art that any block diagrams herein represent conceptual views of illustrative circuitry embodying exemplary embodiments.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

A person of skill in the art would readily recognize that steps of various above-described methods can be performed and/or controlled by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:
1. Apparatus comprising:
at least one movable reflective surface that reflects electromagnetic waves; and
at least one actuator coupled with the at least one movable reflective surface, wherein:
said at least one actuator at least temporarily drives a linear displacement of all of said at least one movable reflective surface in a direction substantially normal to the at least one movable reflective surface; and
said linear displacement is driven in an oscillating motion having altering frequency to mechanically modulate the reflected electromagnetic waves to encode a bit sequence of data into the reflected electromagnetic waves;

wherein the apparatus encodes the bit sequence of data into the reflected electromagnetic waves using pulse compression linear frequency modulation.

2. Apparatus according to claim 1, wherein said at least one movable reflective surface reflects electromagnetic waves that have a frequency of 3 gigahertz, GHz, or greater and/or to reflect electromagnetic waves in the millimetre wave range.

3. Apparatus according to claim 1, wherein said at least one movable reflective surface comprises at least one of the following components: electrically conductive material, metal, and electrically isolating material with an electrically conductive surface.

4. Apparatus according to claim 1, wherein said at least one actuator comprises at least one of: a piezoelectric element, a magnetostrictive element, an electroactive module, and a piezoelectric film.

5. Apparatus according to claim 1, wherein said at least one movable reflective surface is a surface of said at least one actuator.

6. Apparatus according to claim 1, wherein said apparatus comprises at least one movable reflector element having said at least one reflective surface, and wherein said actuator drives a linear displacement of said at least one movable reflector element and/or of said at least one reflective surface.

7. Apparatus according to claim 1, comprising a plurality of movable reflecting surfaces that reflect said electromagnetic waves, wherein said at least one actuator at least temporarily drives a linear displacement of at least one of said plurality of movable reflecting surfaces.

8. Apparatus according to claim 1, comprising one or more reflector elements on said at least one movable reflective surface, or, on said at least one movable reflective surface and a reflective surface different from said at least one movable reflective surface.

9. Apparatus according to claim 1, comprising a control unit that applies a control signal to said at least one actuator.

10. Apparatus according to claim 9, comprising more than one actuator, wherein said control unit at least temporarily applies different control signals to different actuators.

11. Apparatus according to claim 1, wherein said at least one reflective surface comprises a photovoltaic element.

12. Radio device comprising a radio interface for wirelessly exchanging data with at least one further device, wherein said radio device comprises at least one apparatus according to claim 1.

13. Radio device comprising:
a transmitter that transmits electromagnetic waves via an antenna system with a first beam characteristic to an apparatus according to claim 1; and
a receiver that receives reflected modulated electromagnetic waves from said apparatus, wherein said radio device determines a second beam characteristic for said antenna system depending on said received reflected modulated electromagnetic waves.

14. Radio system comprising:
a first radio device comprising a radio interface for wirelessly exchanging data with a second radio device, wherein said first radio device comprises at least one apparatus according to claim 1; and
the second radio device comprising:
a transmitter that transmits electromagnetic waves via an antenna system with a first beam characteristic to the at least one apparatus according to claim 1; and
a receiver that receives reflected modulated electromagnetic waves from said at least one apparatus, wherein said second radio device determines a second beam characteristic for said antenna system depending on said received reflected modulated electromagnetic waves.

15. Method of operating a radio system according to claim 14, said method comprising:
transmitting a first signal from said second radio device via an antenna system with a first beam characteristic to said first radio device,
mechanically modulating and reflecting, by said first radio device, at least a portion of said first signal,
receiving said mechanically modulated and reflected first signal at said second radio device, and
determining a second beam characteristic for said antenna system depending on said received modulated and reflected first signal.

16. Method according to claim 15, further comprising:
performing further transmissions from said second radio device to said first radio device using said second beam characteristic.

17. Apparatus according to claim 1, wherein the at least one actuator is a piezoelectric element.

18. Apparatus according to claim 9, wherein the control unit activates and deactivates the at least one actuator to alter the frequency of the oscillating motion of the at least one movable reflective surface to encode different bit values of the bit sequence of data into the reflected electromagnetic waves.

19. Method of operating an apparatus comprising at least one movable reflective surface that reflects electromagnetic waves and at least one actuator coupled with the at least one movable reflective surface, wherein said method comprises:
at least temporarily driving, by means of said actuator, a linear displacement of said at least one movable reflective surface in a direction substantially normal to the at least one movable reflective surface, wherein said linear displacement is driven in an oscillating motion having altering frequency to mechanically modulate the reflected electromagnetic waves to encode a bit sequence of data into the reflected electromagnetic waves; wherein the apparatus encodes the bit sequence of data into the reflected electromagnetic waves using pulse compression linear frequency modulation.

* * * * *

UNITED STATES PATENT AND TRADEMARK OFFICE
CERTIFICATE OF CORRECTION

PATENT NO. : 11,923,617 B2
APPLICATION NO. : 17/289086
DATED : March 5, 2024
INVENTOR(S) : Mohammed Alloulah et al.

It is certified that error appears in the above-identified patent and that said Letters Patent is hereby corrected as shown below:

In the Claims

In Column 16, Line 58, delete "all of" from --said at least one actuator at least temporarily drives a linear displacement of all of said at least one movable reflective surface--.

Signed and Sealed this
Tenth Day of December, 2024

Katherine Kelly Vidal
*Director of the United States Patent and Trademark Office*